(12) United States Patent
Tomoi et al.

(10) Patent No.: US 8,940,835 B2
(45) Date of Patent: Jan. 27, 2015

(54) THERMOPLASTIC ELASTOMER COMPOSITION AND PNEUMATIC TIRE USING SAME

(75) Inventors: Shusaku Tomoi, Hiratsuka (JP); Koichi Kawaguchi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 166 days.

(21) Appl. No.: 13/639,337

(22) PCT Filed: May 17, 2011

(86) PCT No.: PCT/JP2011/061707
§ 371 (c)(1),
(2), (4) Date: Oct. 4, 2012

(87) PCT Pub. No.: WO2012/026167
PCT Pub. Date: Mar. 1, 2012

(65) Prior Publication Data
US 2013/0025757 A1    Jan. 31, 2013

(30) Foreign Application Priority Data
Aug. 26, 2010  (JP) .................................. 2010-189357

(51) Int. Cl.
| | | |
|---|---|---|
| *B60C 5/14* | (2006.01) |
| *C08L 15/02* | (2006.01) |
| *C08L 23/08* | (2006.01) |
| *C08L 29/04* | (2006.01) |
| *C08L 77/02* | (2006.01) |
| *C08L 77/00* | (2006.01) |
| *B60C 1/00* | (2006.01) |

(52) U.S. Cl.
CPC .............. *C08L 77/00* (2013.01); *B60C 1/0008* (2013.01)
USPC .............................. 525/57; 152/510; 525/179

(58) Field of Classification Search
None
See application file for complete search history.

(56) References Cited

U.S. PATENT DOCUMENTS

| | | | |
|---|---|---|---|
| 5,910,544 A | 6/1999 | Ozawa et al. | |
| 6,079,465 A | 6/2000 | Takeyama et al. | |
| 2008/0275187 A1* | 11/2008 | Tsou et al. | 525/178 |
| 2008/0314490 A1 | 12/2008 | Morooka | |
| 2009/0038729 A1* | 2/2009 | Soeda et al. | 152/510 |
| 2010/0024941 A1 | 2/2010 | Hara et al. | |
| 2010/0071823 A1 | 3/2010 | Tomoi | |
| 2010/0108221 A1 | 5/2010 | Shibata et al. | |
| 2011/0024015 A1 | 2/2011 | Takahashi et al. | |
| 2012/0214943 A1* | 8/2012 | Sato et al. | 525/57 |

FOREIGN PATENT DOCUMENTS

| | | |
|---|---|---|
| CN | 101389495 A | 3/2009 |
| JP | 10-25375 A | 1/1989 |
| JP | 08-216610 A | 8/1996 |
| JP | 8-259741 A | 10/1996 |
| JP | 2002-052904 A | 2/2002 |
| JP | 2007-291256 A | 11/2007 |
| JP | 2008-273424 A | 11/2008 |
| JP | 2009-523081 A | 6/2009 |
| JP | 2009-263653 A | 11/2009 |
| JP | 2010-507510 A | 3/2010 |
| WO | WO-2008-096900 A1 | 8/2008 |

* cited by examiner

*Primary Examiner* — Robert Sellers
(74) *Attorney, Agent, or Firm* — Novak Druce Connolly Bove + Quigg LLP

(57) ABSTRACT

Provided is a thermoplastic elastomer composition that can be suitably used for the inner liners of pneumatic tires and exhibits high air barrier properties and high fatigue durability. The present invention is a thermoplastic elastomer composition comprising a thermoplastic resin composition and a rubber composition dispersed in the thermoplastic resin composition, wherein the thermoplastic resin composition comprises a polyamide and an ethylene-vinyl alcohol copolymer or a poly(vinyl alcohol), the rubber composition comprises a halogenated isoolefin-p-alkylstyrene copolymer and is cross inked. The thermoplastic resin composition preferably comprises 1 to 25% by weight of the ethylene-vinyl alcohol copolymer or the poly(vinyl alcohol). The thermoplastic elastomer composition preferably comprises 100 parts by weight of the thermoplastic resin composition and 80 to 200 parts by weight of the halogenated isoolefin-p-alkylstyrene copolymer.

20 Claims, No Drawings

THERMOPLASTIC ELASTOMER COMPOSITION AND PNEUMATIC TIRE USING SAME

CROSS REFERENCE TO RELATED APPLICATIONS

This application is a National Phase filing under 35 U.S.C. §371 of PCT/JP2011/061707 filed on May 17, 2011; and this application claims priority to Application No. 2010-189357 filed in Japan on Aug. 26, 2010, under 35 U.S.C. §119; the entire contents of all are hereby incorporated by reference.

TECHNICAL FIELD

The present invention relates to a thermoplastic elastomer composition comprising a thermoplastic resin composition and a rubber composition dispersed in the thermoplastic resin composition. In particular, the invention relates to a thermoplastic elastomer composition that can be used for inner liners of pneumatic tires.

BACKGROUND ART

A pneumatic tire is known that uses, as an air permeation preventing layer, a film made of a thermoplastic elastomer composition prepared by blending an elastomer such as a brominated isobutylene-p-methylstyrene copolymer with a thermoplastic resin such as polyamide-based resin, poly(vinyl alcohol), or an ethylene-vinyl alcohol copolymer (JP2008-273424 A).

In addition, a tire inner liner is known that uses a film including at least a layer made of a resin composition prepared by dispersing a viscous elastic body such as brominated isobutylene-p-methylstyrene in a resin including a modified ethylene-vinyl alcohol copolymer (JP 2009-263653 A).

In addition, a pneumatic tire is known that uses, as an inner liner, a laminate of a layer made of a thermoplastic resin composition including an ethylene-vinyl alcohol copolymer and/or a polyamide resin and a layer made of a thermoplastic polymer composition prepared by dispersing a modified polymer composition such as a brominated isobutylene-p-methylstyrene copolymer in a matrix of a thermoplastic resin composition such as nylon 666 (JP 2009-523081 A).

SUMMARY OF INVENTION

Technical Problem

The thermoplastic elastomer composition prepared by dispersing a brominated isobutylene-p-methylstyrene copolymer in a polyamide exhibits air barrier properties equivalent to or higher than those of conventional butyl inner liners when used for the inner liners of pneumatic tires. However, due to recent safety and environmental concerns, a thermoplastic elastomer composition having higher air barrier properties is being pursued.

Meanwhile, the thermoplastic elastomer composition prepared by dispersing a brominated isobutylene-p-methylstyrene copolymer in an ethylene-vinyl alcohol copolymer exhibits high air barrier properties but low fatigue durability when used for the inner liners of pneumatic tires.

It is an object of the present invention to provide a thermoplastic elastomer composition exhibiting high air barrier properties and high fatigue durability.

Solution to Problem

A first invention of the present invention is a thermoplastic elastomer composition comprising a thermoplastic resin composition and a rubber composition dispersed in the thermoplastic resin composition, wherein the thermoplastic resin composition comprises a polyamide and an ethylene-vinyl alcohol copolymer or a poly(vinyl alcohol), and the rubber composition comprises a halogenated isoolefin-p-alkylstyrene copolymer and is crosslinked.

The thermoplastic resin composition preferably comprises 1 to 25% by weight of the ethylene-vinyl alcohol copolymer or the poly(vinyl alcohol) based on a total weight of the thermoplastic resin composition.

The thermoplastic elastomer composition preferably comprises 100 parts by weight of the thermoplastic resin composition and 80 to 200 parts by weight of the halogenated isoolefin-p-alkylstyrene copolymer.

The halogenated isoolefin-p-alkylstyrene copolymer is preferably a brominated isobutylene-p-methylstyrene copolymer.

The polyamide is preferably at least one selected from the group consisting of nylon 6, nylon 66, nylon 11, nylon 12, nylon 610, nylon 612, nylon 6/66, nylon MXD6, and nylon 6T.

The ethylene-vinyl alcohol copolymer preferably has an ethylene composition ratio of 1 to 55 mol % and a saponification degree of 90% or more.

The poly(vinyl alcohol) preferably has a saponification degree of 90% or more.

An air permeation coefficient of the thermoplastic elastomer composition measured based on JIS K 7126-1 at a temperature of 30° C. is preferably $3.0 \times 10^{-12}$ cc·cm/cm$^2$·sec·cmHg or lower.

A second invention of the present invention is a method for producing the thermoplastic elastomer composition, comprising continuously kneading a thermoplastic resin composition and a rubber composition using a twin-screw kneader to disperse the rubber composition in the thermoplastic resin composition by the kneading and dynamically crosslink the rubber composition.

A third invention of the present invention is a pneumatic tire using the thermoplastic elastomer composition as an inner liner.

Advantageous Effects of Invention

The thermoplastic elastomer composition according to the present invention exhibits high air barrier properties and high fatigue durability.

DESCRIPTION OF EMBODIMENTS

A thermoplastic elastomer composition according to the present invention comprises a thermoplastic resin composition and a rubber composition dispersed in the thermoplastic resin composition. In the thermoplastic elastomer composition, the thermoplastic resin composition preferably forms a matrix phase and the rubber composition preferably forms a disperse phase.

The thermoplastic resin composition comprises a polyamide and an ethylene-vinyl alcohol copolymer or a poly(vinyl alcohol). In other words, the thermoplastic resin composition may comprise a polyamide and an ethylene-vinyl alcohol copolymer, may comprise a polyamide and a poly(vinyl alcohol), and may comprise a polyamide, an ethylene-vinyl alcohol copolymer, and a poly(vinyl alcohol).

The polyamide contained in the thermoplastic resin composition is preferably in an amount of 75 to 99% by weight of a total amount of the thermoplastic resin composition, and more preferably in an amount of 80 to 95% by weight thereof.

If the amount of the polyamide is too low, air barrier properties significantly decrease due to its use (fatigue) and also durability becomes low. Conversely if the amount thereof is too high, air barrier properties are reduced.

An amount of the ethylene-vinyl alcohol copolymer or the poly(vinyl alcohol) contained in the thermoplastic resin composition (a total amount of the ethylene-vinyl alcohol copolymer and the poly(vinyl alcohol) when the thermoplastic resin composition comprises the ethylene-vinyl alcohol copolymer and the poly(vinyl alcohol)) is preferably 1 to 25% by weight of a total amount of the thermoplastic resin composition, and more preferably 5 to 20% by weight thereof. If the amount of the ethylene-vinyl alcohol copolymer or the poly(vinyl alcohol) is too low, air barrier properties become low, and conversely if the amount thereof is too high, air barrier properties significantly decrease due to its use (fatigue), and also durability is decreased.

The polyamide to be used in the present invention is not limited but preferably is at least one selected from the group consisting of nylon 6, nylon 66, nylon 11, nylon 12, nylon 610, nylon 612, nylon 6/66, nylon MXD6, and nylon 6T. Among them, nylon 6 and nylon 6/66 are preferable in terms of compatibility between durability and air barrier properties.

The ethylene-vinyl alcohol copolymer (hereinafter also referred to as "EVOH") to be used in the present invention is a copolymer having an ethylene unit ($-CH_2CH_2-$) and a vinyl alcohol unit ($-CH_2-CH(OH)-$). In addition to the ethylene unit and the vinyl alcohol unit, another constituent unit may be contained as long as the constituent unit does not inhibit the advantages of the present invention. In the ethylene-vinyl alcohol copolymer to be used in the present invention, a content of the ethylene unit, namely, an ethylene composition ratio is preferably 1 to 55 mol %, and more preferably 20 to 50 mol %. If the ethylene composition ratio of the ethylene-vinyl alcohol copolymer is too low, plasticity of the ethane vinyl alcohol copolymer decreases and thus durability is decreased. Conversely, if the ethylene composition ratio is too high, air barrier properties are decreased. The ethylene-vinyl alcohol copolymer is a saponified ethylene-vinyl acetate copolymer and has a saponification degree of preferably 90% or more, and more preferably 99% or more. If the saponification degree of the ethylene-vinyl alcohol copolymer is too low, air barrier properties are decreased and also heat stability is decreased. Ethylene-vinyl alcohol copolymers are commercially available and, for example, can be obtained from Nippon Synthetic Chemical Industry Co., Ltd. under the product name SOARNOL® and from Kuraray Co., Ltd., under the product name EVAL®. Examples or the ethylene-vinyl alcohol copolymers having the ethylene composition ratio of 1 to 55 mol % and the saponification degree of 90% or more include SOARNOL® H4815 having an ethylene composition ratio of 48 mol % and a saponification degree of 99% or more, A4412B having an ethylene composition ratio of 42 mol % and a saponification degree of 99% or more, DC322B having an ethylene composition ratio of 32 mol % and a saponification degree of 99% or more, and V2504RB having an ethylene composition ratio of 25 mol % and a saponification degree of 99% or more, manufactured by Nippon Synthetic Chemical Industry Co., Ltd., and EVAL® L171B having an ethylene composition ratio of 27 mol % and a saponification degree of 99% or more, H171B having an ethylene composition ratio of 38 moil and a saponification degree of 99% or more, and E171B having an ethylene composition ratio of 44 mol % and a saponification degree of 99% or more, manufactured by Kuraray Co., Ltd.

The poly(vinyl alcohol) (hereinafter also referred to as "PVA") to be used in the preset invention is a polymer having a vinyl alcohol unit ($-C_2-CH(OH)-$), and may contain another constituent unit, in addition to the vinyl alcohol unit, as long as the constituent unit does not inhibit the advantages of the preset invention. Poly(vinyl alcohol) is a saponified poly(vinyl acetate) and has a saponification degree of preferably 90% or more, and more preferably 95% or more. If the saponification degree is too low, air barrier properties are decreased. Poly(vinyl alcohol) is commercially available and, for example, can be obtained from Nippon Synthetic Chemical Industry Co., Ltd., under the product name GOHSENOL®, and from Kuraray Co., Ltd., under the product name KURARAY POVAL. Examples of poly(vinyl alcohol) having a saponification degree of 90% or more include GOHSENOL® N300 having a saponification degree or 98% or more, manufactured by Nippon Synthetic Chemical Industry Co., Ltd., and KURARAY POVAL® PVA117 having a saponification degree of 98% or more, manufactured by Kuraray Co., Ltd.

The thermoplastic resin composition may comprise resin(s) other than the polyamide, the ethylene-vinyl alcohol copolymer, and the poly(vinyl alcohol), and other substances such as an additive (for example, a plasticizer).

The rubber composition forming the disperse phase of the thermoplastic elastomer composition comprises a halogenated isoolefin-p-alkylstyrene copolymer. The halogenated isoolefin-p-alkylstyrene copolymer is preferably in an amount of 80 to 200 parts by weight, and more preferably in an amount of 90 to 150 parts by weight based on 100 parts by weight in total of the thermoplastic resin composition. If the amount of the halogenated isoolefin-p-alkylstyrene copolymer is too low, low-temperature durability is reduced. Conversely if the amount thereof is too high, fluidity upon melting is decreased, which deteriorates film formability.

The halogenated isoolefin-p-alkylstyrene copolymer to be used in the present invention can be produced by halogenation of a copolymer of isoolefin and p-alkylstyrene. The halogenated isoolefin and p-alkylstyrene's mixture ratio, polymerization rate, average molecular weight, polymerization form (such as a block copolymer or a random copolymer), viscosity, halogen atom, and the like are not specifically limited and can be arbitrarily selected according to physical properties required in the thermoplastic elastomer composition. Examples of isoolefin forming the halogenated isoolefin-p-alkylstyrene copolymer include p-isobutylene, isopentene, and isohexene. Isobutylene is preferable. Examples of the p-alkylstyrene forming the halogenated isoolefin-p-alkylstyrene copolymer include p-methylstyrene, p-ethylstyrene, p-propylstyrene, and p-butylstyrene p-Methylstyrene is preferable. Examples of halogen forming the halogenated isoolefin-p-alkylstyrene copolymer include fluorine, chlorine, bromine, and iodine. Bromine is preferable. A particularly preferable halogenated isoolefin-p-alkylstyrene copolymer is a brominated isobutylene-p-methylstyrene copolymer.

The brominated isobutylene-p-methyl styrene copolymer is obtained by brominating an isobutylene-p-methylstyrene copolymer having a rep-eating unit expressed by formula (1):

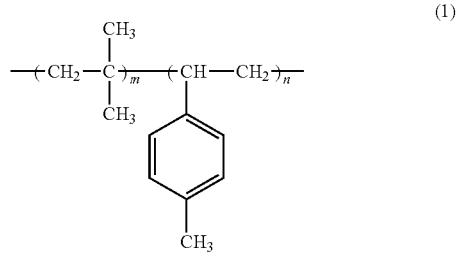

(1)

and typically has a repeating unit expressed by formula (2):

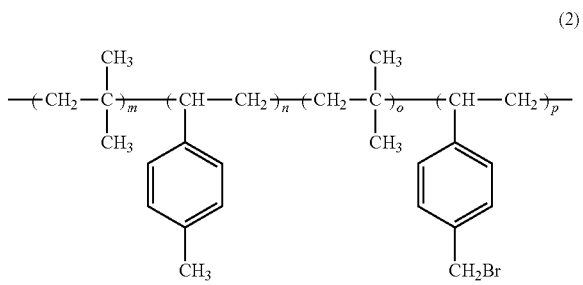

The brominated isobutylene-p-methylstyrene copolymer is available from ExxonMobil Chemical Company under the product name EXXPRO®.

The rubber composition can comprise, besides a halogenated isobutylene-p-methylstyrene copolymer, various additives generally blended in resin or rubber compositions, such as a crosslinking agent (a vulcanizing agent), a crosslinking (vulcanization) accelerator, other reinforcing agents (fillers) such as carbon black and silica, a plasticizer, oil, and an antioxidant. Amounts of these additives to be mixed can be set to conventionally common additive amounts as long as their amounts do not depart from the intended purpose of the invention. Furthermore, the rubber composition can comprise resin(s) or rubber(s) other than the halogenated isoolefin-p-alkylstyrene copolymer in a range not inhibiting the advantages of the invention.

The thermoplastic elastomer composition according to the present invention comprises at least a polyamide, an ethylene-vinyl alcohol copolymer or a poly(vinyl alcohol), and a halogenated isoolefin-p-alkylstyrene copolymer, and may comprise resin(s) or rubber (s) other than those. For example, the thermoplastic elastomer composition according to the invention may comprise a modified polymer, and, depending on its use purpose, preferably comprises a modified polymer. Examples of the modified polymer include polymers obtained by adding an acid anhydride group or an epoxy group to ethylene-α-olefin copolymers such as an ethylene-propylene copolymer, an ethylene-butene copolymer, an ethylene-hexene copolymer, and an ethylene-octene copolymer, or ethylene-unsaturated carboxylic acid copolymers or derivatives thereof, such as an ethylene-acrylate copolymer, an ethylene-methacrylate copolymer, an ethylene-methyl acrylate copolymer, and an ethylene-methyl methacrylate copolymer. When such a modified polymer is added to the thermoplastic elastomer composition, the modified polymer is rather present in a rubber-composition disperse phase and acts as a compatibilizer to contribute to improve the adhesion of an interface between the matrix phase of the thermoplastic resin composition and the disperse phase of the rubber composition. The modified polymer to be added is preferably in an amount of 5 to 100 parts by weight, and more preferably in an amount of 20 to 80 parts by weight, based on 100 parts by weight in total of the thermoplastic resin composition.

The thermoplastic elastomer composition according to the present invention has an air permeation coefficient measured based on JIS K 7126-1 at a temperature of 30° C. of preferably $3.0 \times 10^{-12}$ cc·cm/cm$^2$·sec·cmHg or lower, and more preferably $2.0 \times 10^{-12}$ cc·cm/cm$^2$·sec·cmHg or lower. If the air permeation coefficient is too large, the thermoplastic elastomer composition is not suitable to use as an inner liner of a pneumatic tire. The value "$1.0 \times 10^{-12}$ cc·cm/cm$^2$·sec·cmHg" can be converted to "$75.2 \times 10^{-9}$ mm$^3$·mm/mm$^2$·sec·MPa".

In the thermoplastic elastomer composition according to the present invention, in the thermoplastic resin composition preferably forms the matrix phase and the rubber composition preferably forms the disperse phase. Such a phase structure can be obtained by appropriately selecting a mixing ratio between the thermoplastic resin composition and the rubber composition and viscosities thereof. Theoretically, the thermoplastic resin composition forms the matrix phase more easily as a mixing percentage of the thermoplastic resin composition is higher and the viscosity of the resin composition is lower.

The rubber composition forming the disperse phase of the thermoplastic elastomer composition is crosslinked, and preferably it is crosslinked by dynamic crosslinking. By crosslinking the rubber composition, the matrix phase and the disperse phase of the thermoplastic elastomer composition can be fixed. The crosslinking can be carried out by melt-kneading a non-cross linked rubber composition with a crosslinking agent.

Examples of the crosslinking agent to be used for the crosslinking include zinc oxide, stearic acid, zinc stearate, magnesium oxide, m-phenylene bismaleimide, alkyl phenolic resins and halogenated products thereof, secondary amines (such as N-(1,3-dimethyl)-N'-phenyl-p-phenylenediamine, and polymerized 2,2,4-trimethyl-1,2-dihydroquinoline). Among them, zinc oxide, stearic, acid, zinc stearate, and N-(1,3-dimethyl)-N'-phenyl-p-phenylenediamine are preferably used as the crosslinking agent.

The crosslinking agent is preferably in an amount of 0.1 to 12 parts by weight, and more preferably in an amount of 1 to 9 parts by weight based on 100 parts by weight of the halogenated isoolefin-p-alkylstyrene copolymer. If the amount of the crosslinking agent is too low, crosslinking becomes insufficient, and thus, microdispersion of the halogenated isoolefin-p-alkylstyrene copolymer cannot be maintained, resulting in the reduction in durability. Conversely, if the amount thereof is too high, scorching occurs during kneading and/or a foreign object may be generated in a film.

The thermoplastic elastomer composition according to the present invention is not limited and can be produced by melt-kneading a thermoplastic resin composition, a non-crosslinked rubber composition, and a crosslinking agent at a temperature of not less than a melting point of a polyamide. The crosslinking agent may be previously mixed with the non-crosslinked rubber composition, may be added before melt-kneading, or may be added during melt-kneading. Melt-kneading temperature is a temperature not less than the melting point of a polyamide, and preferably a temperature that is 20° higher than the melting point of a polyamide, such as 180 to 300° C. Melt-kneading time is usually 1 to 10 minutes, and preferably 1 to 5 minutes.

Preferably, the thermoplastic elastomer composition according to the present invent on cat be produced by continuously kneading a thermoplastic resin composition and a rubber composition using a twin-screw kneader to disperse the rubber composition in the thermoplastic resin composition by the kneading and dynamically crosslink the rubber composition.

More specifically, for example, a halogenated isoolefin-p-alkylstyrene copolymer, a crosslinking agent, and, as needed, other additives are mixed together at 60 to 150° C. to prepare a rubber compound. Then, the rubber compound, a polyamide, and an ethylene-vinyl alcohol copolymer or a poly (vinyl alcohol), and, as needed, other resin(s) or additive(s) are placed in a twin-screw kneader with a predetermined temperature of 220 to 250° C., and the halogenated isoolefin-p-alkylstyrene copolymer is dispersed and dynamically crosslinked to obtain the thermoplastic elastomer composition according to the invention.

The thermoplastic elastomer composition according to the present invention may comprise any component other than the above-described components as long as the component does not inhibit the advantages of the invention.

The thermoplastic elastomer composition according to the present invention can be formed into a film by a T-die-equipped extruder, an inflation molding apparatus, or the like. T e film can be suitably used as the inner liners of pneumatic tires because of its excellent air barrier properties and excel lent durability.

The thermoplastic elastomer composition according to the present invention can also be formed into a laminate by laminating the elastomer composition with an adhesive composition. The adhesive composition is preferably excellent in adhesion with a rubber forming a pneumatic tire, although not specifically limited. An example of the adhesive composition is a composition comprising an epoxidized styrene-butadiene-styrene block copolymer, zinc oxide, stearic acid, a vulcanization accelerator, and a tackifier. The laminate of the thermoplastic elastomer composition and the adhesive composition can be produced, for example, by co-extrusion of the thermoplastic elastomer composition and the adhesive composition. The laminate of the thermoplastic elastomer composition and the adhesive composition exhibits high adhesion with a rubber forming a pneumatic tire, so that the laminate can be suitably used as the inner liners of pneumatic tires.

A pneumatic tire according to the present invention is a pneumatic tire produced by using the above-described thermoplastic elastomer composition as an inner liner, and more specifically, a pneumatic tire produced by using a film made of the thermoplastic elastomer composition or the above-described laminate as an inner liner. The tire can be produced by a normal method. For example, the thermoplastic elastomer composition according to the invention is extruded into a film form having a predetermined width and a predetermined thickness to obtain a film as an inner liner, which is then attached on a tire molding drum in a cylindrical shape. Thereon are sequentially attached members used for usual tire production, such as a carcass layer, a belt layer, and a tread layer made of unvulcanized rubber, and the laminated product is taken out from the drum to obtain a green tire. Next, by heat vulcanization of the green tire according to a normal method, a desired pneumatic tire can be produced.

EXAMPLES (1) Preparation of Thermoplastic Elastomer Compositions

Raw materials of thermoplastic elastomer compositions used were as follows:

Br-IPMS: Brominated isobutylene-p-ethylstyrene copolymer EXXPRO® MDX-89-4 manufactured by ExxonMobil. Chemical Company.

Zinc oxide: Zinc oxide JIS #3 manufactured by Seido Chemical Industry Co., Ltd.

Stearic acid: Beads stearate manufactured by NOF Corporation

Zinc stearate: Zinc stearate manufactured by Sakai Chemical Industry Co., Ltd.

Nylon 6/66: "UBE NYLON" 5013B manufactured by DBE Industries, Ltd.

EVOH Et: 48%): Ethylene-vinyl alcohol copolymer SOARNOL® H4815B having an ethylene composition ratio of 48 mol % and a saponification degree of 99% or more, manufactured by Japan Synthetic Chemical Industry Co. Ltd.

EVOH (Et: 42%): Ethylene-vinyl alcohol copolymer SOARNOL® A4412B having an ethylene composition ratio of 42 mol % and a saponification degree of 99% or more, manufactured by Japan Synthetic Chemical Industry Co., Ltd.

EVOH (Et: 32%): Ethylene-vinyl alcohol copolymer SOARNOL® DC3212B having an ethylene composition ratio of 32 mol % and a saponification degree of 99% or more, manufactured by Japan Synthetic Chemical Industry Co., Ltd.

EVOH (Et: 25%): Ethylene-vinyl alcohol copolymer SOARNOL® V2504RB having an ethylene composition ratio of mol % and a saponification degree of 99% or more, manufactured by Japan Synthetic Chemical Industry Co., Ltd.

PVA: Poly(vinyl alcohol) GOHSENOL® N300 having a saponification degree of 98% or more, manufactured by Nippon Synthetic Chemical Industry Co., Ltd.

Mah-EB: Maleic acid-modified ethylene-butene copolymer TAFMER® MH-7010 manufactured by Mitsui Chemicals, Inc.

Among the raw materials shown in Table 1, the rubber and the crosslinking agents (zinc oxide, stearic acid, and zinc stearate) were mixed by a closed type Banbury mixer (manufactured by Kobe Steel, Ltd.) at 100° C. for 2 minutes to prepare a rubber compound, which was then processed into a pellet form by a rubber pelletizer (manufactured by Moriyama Manufacturing Co, Ltd.). The pellet of the rubber compound, resins (nylon 6/66 n and an EVOH), and the acid-modified polymer were kneaded by a twin screw kneading extruder (manufactured by The Japan Steel Works, Ltd) at 250° C. for 3 minutes. The kneaded product was successively extruded into a strand form from the extruder, cooled down with water, and then cut with a cutter to obtain a pellet-shaped thermoplastic elastomer composition. The obtained thermoplastic elastomer composition was a composition in which the rubber was dispersed in the resins.

(2) Preparation of Adhesive Composition

Raw materials of the adhesive composition used were as follows:

Epoxidized SBS: Epoxidized styrene-butadiene-styrene block copolymer EPOFRIEND® AT501 manufactured by Daicel Chemical Industries, Ltd.

Zinc oxide: Zinc oxide JIS #3 manufactured by Seido Chemical Industry Co., Ltd.

Stearic acid: Beads stearate manufactured by NOF Corporation

Vulcanization accelerator: "NOCCELER" TOT-N manufactured by Ouchi Shinko Chemical Industrial Co., Ltd.

Tackifer: YS Resin D105 manufactured by Yasuhara Chemical Co. Ltd.

Pellets of the respective raw materials shown in Table 2 were placed in a twin screw kneading extruder (TEX44 manufactured by The Japan Steel Works, Ltd) to be kneaded at 120° C. for 3 minutes. The kneaded product was successively extruded in a strand form from the extruder. The extruded product having the strand form was cooled down with water and cut with a cutter to obtain a pellet-shaped adhesive composition.

(3) Preparation of Thermoplastic Elastomer Composition Films

The thermoplastic elastomer compositions prepared in (1) and the adhesive composition prepared in (2) were extruded into a two-layered tubular form at 230° C. using an inflation molding apparatus (manufactured by Puraco Co., Ltd.,) such that the thermoplastic elastomer composition is positioned on the inside and the adhesive composition is positioned on the outside, to inflate the tubular product by air blow. Then, the product was folded by a pinch roll and wound to obtain a tubular laminate. In the obtained laminate, the layer of the thermoplastic elastomer composition had a thickness of 100 μm and the layer of the adhesive composition had a thickness of 30 μm.

(4) Production of Pneumatic Tire

The laminate produced in the above (3) is placed on a tire molding drum such that the adhesive composition layer is on the outside (a side opposite to the drum). Thereon are sequentially attached members used in usual tire production, such as a carcass layer, a belt layer and a tread layer made of unvulcanized rubber, and then the drum is taken out to obtain a green tire. Next, the green tire is subjected to heat vulcanization according to a usual method to produce a tire having a size of 195/65R15.

(5) Evaluation

Regarding the prepared thermoplastic elastomer compositions, air permeation coefficients and the number of cracks occurring in durability test were measured. Table 2 shows the results.

An air permeation coefficient measurement method and a durability test method are as follows:

[Air Permeation Coefficient]

From laminates of the thermoplastic elastomer compositions as produced in (3), the adhesive composition was wiped off by melting the adhesive composition using methyl ethyl ketone (MEK), and air permeation coefficients (cc·cm/cm$^2$·sec·cmHg) were obtained based on JIS K7126-1 (a differential pressure method) at a temperature of 30° C. The smaller the air permeation coefficient, the higher the air barrier properties.

[Durability Test]

Tires produced as in (4) were installed in an FF vehicle with an engine displacement of 1800 cc, on wheels having a rim size of 15×6JJ at an internal air pressure of 200 kPa to run the vehicle for 30,000 km on an actual road. After that, the tires were removed from the rims and the laminates arranged on the inner faces of the tires were observed to check the number of cracks. The smaller the number of cracks, the higher the durability.

TABLE 1

Formulations of Thermoplastic Elastomer Compositions and Evaluation Results

| | | Ex. 1 | Ex. 3 | Ex. 3 | Ex. 4 | Ex. 5 | Ex. 6 | Ex. 7 |
|---|---|---|---|---|---|---|---|---|
| Rubber | Br-IPMS | 100.0 | 100.0 | 100.0 | 100.0 | 100.0 | 100.0 | 100.0 |
| Crosslinking agent | Zinc oxide | 5.0 | 5.0 | 5.0 | 5.0 | 5.0 | 5.0 | 5.0 |
| | Stearic acid | 0.6 | 0.6 | 0.6 | 0.6 | 0.6 | 0.6 | 0.6 |
| | Zinc stearate | 0.3 | 0.3 | 0.3 | 0.3 | 0.3 | 0.3 | 0.3 |
| Resin | Nylon 6/66 | 89.1 | 85.5 | 81.0 | 76.5 | 72.0 | 67.5 | 63.0 |
| | EVOH (Et: 48%) | 0.9 | 4.5 | 9.0 | 13.5 | 18.0 | 22.5 | 27.0 |
| | EVOH (Et: 42%) | | | | | | | |
| | EVOH (Et: 32%) | | | | | | | |
| | EVOH (Et: 25%) | | | | | | | |
| | PVA | | | | | | | |
| Acid-modified polymer | Mah-EB | 40.0 | 40.0 | 40.0 | 40.0 | 40.0 | 40.0 | 40.0 |
| Amount of EVOH or PVA based on a total resin amino amount (%) | | 1% | 5% | 10% | 15% | 20% | 25% | 30% |
| Air permeation coefficient/ $10^{-12}$ cc · cm/cm$^2$ · cmHg · s | | 2.9 | 1.9 | 1.3 | 1.1 | 1.0 | 0.8 | 0.6 |
| Number of cracks in durability test | | 0 | 0 | 1 | 3 | 5 | 9 | 12 |

TABLE 2

Formulations of Thermoplastic Elastomer Compositions and Evaluation Results (Continued from Table 1)

| | | Ex. 8 | Ex. 9 | Ex. 10 | Ex. 11 | Ex. 12 | Ex. 13 | Ex. 14 | Comp. Ex. 1 |
|---|---|---|---|---|---|---|---|---|---|
| Rubber | Br-IPMS | 100.0 | 100.0 | 100.0 | 100.0 | 100.0 | 100.0 | 100.0 | 100.0 |
| Crosslinking agent | Zinc oxide | 5.0 | 5.0 | 5.0 | 5.0 | 5.0 | 5.0 | 5.0 | 5.0 |
| | Stearic acid | 0.6 | 0.6 | 0.6 | 0.6 | 0.6 | 0.6 | 0.6 | 0.6 |
| | Zinc stearate | 0.3 | 0.3 | 0.3 | 0.3 | 0.3 | 0.3 | 0.3 | 0.3 |
| Resin | Nylon 6/66 | 85.5 | 81.0 | 85.5 | 81.0 | 85.5 | 81.0 | 85.5 | 90.0 |
| | EVOH (Et: 48%) | | | | | | | | |
| | EVOH (Et: 42%) | 4.5 | 9.0 | | | | | | |
| | EVOH (Et: 32%) | | | 4.5 | 9.0 | | | | |
| | EVOH (Et: 25%) | | | | | 4.5 | 9.0 | | |
| | PVA | | | | | | | 4.5 | |
| Acid-modified polymer | Mah-EB | 40.0 | 40.0 | 40.0 | 40.0 | 40.0 | 40.0 | 40.0 | 40.0 |
| Amount of EVOH or PVA based on a total resin amount (%) | | 5% | 10% | 5% | 10% | 5% | 10% | 5% | 0% |

TABLE 2-continued

Formulations of Thermoplastic Elastomer Compositions and Evaluation Results (Continued from Table 1)

| | Ex. 8 | Ex. 9 | Ex. 10 | Ex. 11 | Ex. 12 | Ex. 13 | Ex. 14 | Comp. Ex. 1 |
|---|---|---|---|---|---|---|---|---|
| Air permeation coefficient/ $10^{-12}$ cc·cm/cm$^2$·cmHg·s | 1.8 | 1.1 | 1.7 | 1.1 | 1.6 | 1.0 | 1.0 | 3.1 |
| Number of cracks in durability test | 0 | 1 | 0 | 2 | 0 | 2 | 10 | 0 |

TABLE 3

Formulation of Adhesive Composition

| | Parts by weight |
|---|---|
| Epoxidized SBS | 100 |
| Zinc oxide | 5 |
| Stearic acid | 1 |
| Vulcanization accelerator | 3 |
| Tackifier | 30 |
| Total | 139 |

INDUSTRIAL APPLICABILITY

The thermoplastic elastomer composition according to the present invention can be suitably used for the inner liners of pneumatic tires.

The invention claimed is:

1. A thermoplastic elastomer composition comprising a thermoplastic resin composition and a rubber composition dispersed in the thermoplastic resin composition, wherein the thermoplastic resin composition comprises a polyamide and an ethylene-vinyl alcohol copolymer or a poly(vinyl alcohol), and the rubber composition comprises a halogenated isoolefin-p-alkylstyrene copolymer and is crosslinked.

2. The thermoplastic elastomer composition according to claim 1, wherein the thermoplastic resin composition comprises 1 to 25% by weight of the ethylene-vinyl alcohol copolymer or the poly(vinyl alcohol) based on a total weight of the thermoplastic resin composition.

3. The thermoplastic elastomer composition according to claim 1, comprising 100 parts by weight of the thermoplastic resin composition and 80 to 200 parts by weight of the halogenated isoolefin-p-alkylstyrene copolymer.

4. The thermoplastic elastomer composition according to claim 1, wherein the halogenated isoolefin-p-alkylstyrene copolymer is a brominated isobutylene-p-methylstyrene copolymer.

5. The thermoplastic elastomer composition according to claim 1, wherein the polyamide is at least one selected from the group consisting of nylon 6, nylon 66, nylon 11, nylon 12, nylon 610, nylon 612, nylon 6/66, nylon MXD6, and nylon 6T.

6. The thermoplastic elastomer composition according to claim 1, wherein the ethylene-vinyl alcohol copolymer has an ethylene composition ratio of 1 to 55 mol % and a saponification degree of 90% or more.

7. The thermoplastic elastomer composition according to claim 1, wherein the poly(vinyl alcohol) has a saponification degree of 90% or more.

8. The thermoplastic elastomer composition according to claim 1, wherein an air permeation coefficient of the thermoplastic elastomer composition measured based on JIS K 7126-1 at a temperature of 30° C. is $3.0 \times 10^{-12}$ cc·cm/cm$^2$·sec·cmHg or lower.

9. A method for producing the thermoplastic elastomer composition according to claim 1, comprising continuously kneading a thermoplastic resin composition and a rubber composition using a twin-screw kneader to disperse the rubber composition in the thermoplastic resin composition by the kneading and dynamically crosslink the rubber composition.

10. A pneumatic tire using the thermoplastic elastomer composition according to claim 1 as an inner liner.

11. The thermoplastic elastomer composition according to claim 2, comprising 100 parts by weight of the thermoplastic resin composition and 80 to 200 parts by weight of the halogenated isoolefin-p-alkylstyrene copolymer.

12. The thermoplastic elastomer composition according to claim 2, wherein the halogenated isoolefin-p-alkylstyrene copolymer is a brominated isobutylene-p-methylstyrene copolymer.

13. The thermoplastic elastomer composition according to claim 3, wherein the halogenated isoolefin-p-alkylstyrene copolymer is a brominated isobutylene-p-methylstyrene copolymer.

14. The thermoplastic elastomer composition according to claim 2, wherein the polyamide is at least one selected from the group consisting of nylon 6, nylon 66, nylon 11, nylon 12, nylon 610, nylon 612, nylon 6/66, nylon MXD6, and nylon 6T.

15. The thermoplastic elastomer composition according to claim 3, wherein the polyamide is at least one selected from the group consisting of nylon 6, nylon 66, nylon 11, nylon 12, nylon 610, nylon 612, nylon 6/66, nylon MXD6, and nylon 6T.

16. The thermoplastic elastomer composition according to claim 4, wherein the polyamide is at least one selected from the group consisting of nylon 6, nylon 66, nylon 11, nylon 12, nylon 610, nylon 612, nylon 6/66, nylon MXD6, and nylon 6T.

17. The thermoplastic elastomer composition according to claim 2, wherein the ethylene-vinyl alcohol copolymer has an ethylene composition ratio of 1 to 55 mol % and a saponification degree of 90% or more.

18. The thermoplastic elastomer composition according to claim 3, wherein the ethylene-vinyl alcohol copolymer has an ethylene composition ratio of 1 to 55 mol % and a saponification degree of 90% or more.

19. The thermoplastic elastomer composition according to claim 4, wherein the ethylene-vinyl alcohol copolymer has an ethylene composition ratio of 1 to 55 mol % and a saponification degree of 90% or more.

20. The thermoplastic elastomer composition according to claim 5, wherein the ethylene-vinyl alcohol copolymer has an ethylene composition ratio of 1 to 55 mol % and a saponification degree of 90% or more.

* * * * *